US012612237B2

(12) United States Patent
Nance et al.

(10) Patent No.: US 12,612,237 B2
(45) Date of Patent: Apr. 28, 2026

(54) REPELLENT SPRAY DISPENSERS AND METHODS OF USE

(71) Applicant: Security Equipment Corporation, Fenton, MO (US)

(72) Inventors: David Nance, Chicago, IL (US); Anthony E. Sprouse, II, Caseyville, IL (US)

(73) Assignee: Security Equipment Corporation, Fenton, MO (US)

( * ) Notice: Subject to any disclaimer, the term of this patent is extended or adjusted under 35 U.S.C. 154(b) by 177 days.

(21) Appl. No.: 18/655,430

(22) Filed: May 6, 2024

(65) Prior Publication Data

US 2024/0367888 A1 Nov. 7, 2024

Related U.S. Application Data

(60) Provisional application No. 63/500,069, filed on May 4, 2023.

(51) Int. Cl.

*B65D 83/20* (2025.01)
*B65D 83/14* (2025.01)
*F41H 9/10* (2006.01)
*G08B 15/00* (2006.01)

(52) U.S. Cl.

CPC ........... *B65D 83/20* (2013.01); *B65D 83/753* (2013.01); *F41H 9/10* (2013.01); *G08B 15/004* (2013.01)

(58) Field of Classification Search

CPC ...... B65D 83/20; B65D 83/753; B65D 83/16; B65D 83/202; G08B 15/004; G08B 15/00; F41H 9/10; F41H 9/04

USPC .............. 222/402.13, 402.1, 402.15; 42/1.08

See application file for complete search history.

(56) References Cited

U.S. PATENT DOCUMENTS

| | | | |
|---|---|---|---|
| 3,236,222 A | 2/1966 | Pitcher | |
| 3,794,791 A * | 2/1974 | Thomson | F21V 33/0064 200/61.93 |
| 3,921,614 A | 11/1975 | Fogelgren | |
| 4,531,503 A | 7/1985 | Shepard | |
| 5,906,191 A | 5/1999 | Wonisch et al. | |
| 7,121,432 B2 | 10/2006 | Kostal et al. | |
| 7,353,815 B2 | 4/2008 | Wei | |
| 7,398,776 B2 | 7/2008 | Casas Salva | |
| D611,115 S | 3/2010 | Pennington | |
| 7,757,682 B2 | 7/2010 | Kaminker et al. | |

(Continued)

OTHER PUBLICATIONS

Guard Dog Light em Up—Self-Defense Combo w/Red Pepper Spray & Flashlight, Amazon Page, First Date Available Sep. 3, 2021(3 Pages).

*Primary Examiner* — David J Walczak

(74) *Attorney, Agent, or Firm* — Hartman Global IP Law; Gary M. Hartman; Domenica N.S. Hartman

(57) ABSTRACT

Repellent spray dispensers and methods of their use. Such a repellent spray dispenser includes a case configured to enclose a canister containing a repellent, an exit orifice configured so that a stream of the repellent propelled from the canister exits the case through the exit orifice, an audible alarm, a first actuating member operable to cause the audible alarm to be generated simultaneously with the stream of the repellent being propelled through the exit orifice of the case, and a second actuating member operable to cause the audible alarm to be generated without causing the stream of the repellent to be propelled through the exit orifice of the case.

10 Claims, 3 Drawing Sheets

(56) References Cited

U.S. PATENT DOCUMENTS

| | | | |
|---|---|---|---|
| 7,784,454 | B2 | 8/2010 | Tiberius et al. |
| 7,921,838 | B2 | 4/2011 | Tippmann, Jr. et al. |
| 8,011,355 | B2 | 9/2011 | Kawashima |
| 8,203,821 | B2 | 6/2012 | Hsieh et al. |
| 8,245,878 | B2 | 8/2012 | Smith et al. |
| D674,943 | S | 1/2013 | Sheikh et al. |
| 8,430,086 | B2 | 4/2013 | Tippmann, Jr. et al. |
| 8,479,432 | B2 | 7/2013 | Braun |
| 8,485,858 | B2 | 7/2013 | Wei |
| 8,550,062 | B2 | 10/2013 | Maeda |
| 8,602,784 | B2 | 12/2013 | Dvorak |
| 8,726,895 | B2 | 5/2014 | Tippmann, Jr. et al. |
| D731,612 | S | 6/2015 | Ying |
| 9,194,647 | B2 | 11/2015 | Maeda |
| 9,200,865 | B2 | 12/2015 | Maeda |
| 9,291,420 | B1 | 3/2016 | Jensen et al. |
| 9,395,146 | B2 | 7/2016 | Tippmann, Jr. et al. |
| D764,009 | S | 8/2016 | Lin |
| D797,882 | S | 9/2017 | Tang |
| D798,415 | S | 9/2017 | Lin |
| D800,446 | S | 10/2017 | Sheikh et al. |
| D806,824 | S | 1/2018 | Fan |
| D838,336 | S | 1/2019 | Tang |
| D845,525 | S | 4/2019 | Sheikh et al. |
| 10,502,396 | B2 | 12/2019 | Huang |
| 10,520,282 | B2 | 12/2019 | Nangunoori |
| D874,608 | S | 2/2020 | Ni |
| D875,202 | S | 2/2020 | Yang |
| D875,876 | S | 2/2020 | Yang |
| D877,849 | S | 3/2020 | Yang |
| D925,798 | S | 7/2021 | Sheikh et al. |
| 11,209,237 | B2 | 12/2021 | Quek |
| 11,402,179 | B2 | 8/2022 | Nance et al. |
| D990,009 | S | 6/2023 | Sheikh et al. |
| D990,738 | S | 6/2023 | Sheikh et al. |
| 2003/0106545 | A1 | 6/2003 | Verini |
| 2004/0046669 | A1 * | 3/2004 | Chiapperini .......... G08B 15/02 340/574 |
| 2006/0191525 | A1 | 8/2006 | Dai |
| 2007/0151551 | A1 | 7/2007 | Verini |
| 2010/0126486 | A1 | 5/2010 | Halmone et al. |
| 2011/0288680 | A1 | 11/2011 | Samain et al. |
| 2013/0055996 | A1 | 3/2013 | Perry |
| 2013/0112771 | A1 | 5/2013 | Ki et al. |
| 2013/0220294 | A1 | 8/2013 | Tippmann, Jr. et al. |
| 2015/0069082 | A1 | 3/2015 | Breeden |
| 2015/0312399 | A1 | 10/2015 | Teig |
| 2015/0327092 | A1 | 11/2015 | Martch |
| 2017/0087576 | A1 | 3/2017 | Fang et al. |
| 2018/0087769 | A1 | 3/2018 | Pires |
| 2021/0055082 | A1 | 2/2021 | Geisler et al. |
| 2021/0108879 | A1 | 4/2021 | Clemons et al. |
| 2021/0381797 | A1 | 12/2021 | Buys |

* cited by examiner

REPELLENT SPRAY DISPENSERS AND METHODS OF USE

CROSS-REFERENCE TO RELATED APPLICATIONS

This application claims the benefit of U.S. Provisional Application No. 63/500,069 filed May 4, 2023, the contents of which are incorporated herein by reference.

BACKGROUND OF THE INVENTION

The invention generally relates to repellent spray dispensers and methods of their use.

It is well known to use a pistol or pepper spray canister to defend against an attacker. However, some users do not wish to carry a pistol or other type of firearm or anything that looks like a firearm. Further, a pepper spray canister does not include any other safety or protective features and may be difficult to accurately aim at an attacker. Therefore, it would be desirable to have a safety device that can deploy a non-lethal repellent product, such as a pepper gel, which does not have the appearance of a typical firearm, and/or that includes additional protection features.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, repellent spray dispensers and methods of their use.

According to a nonlimiting aspect, a repellent spray dispenser includes a case configured to enclose a canister containing a repellent, an exit orifice configured so that a stream of the repellent propelled from the canister exits the case through the exit orifice, means for generating an audible alarm, a first actuating member operable to cause the audible alarm to be generated simultaneously with the stream of the repellent being propelled through the exit orifice of the case, and a second actuating member operable to cause the audible alarm to be generated without causing the stream of the repellent to be propelled through the exit orifice of the case.

According to another nonlimiting aspect, a method of using the repellent spray dispenser includes aiming the exit orifice at an attacker, and either operating the first actuating member to cause the audible alarm to be generated simultaneously with the stream of the repellent being propelled through the exit orifice of the case, or operating the second actuating member to cause the audible alarm to be generated without causing the stream of the repellent to be propelled through the exit orifice of the case.

Technical aspects of dispensers and methods as described above preferably include the ability to provide a personal safety device that can deploy a non-lethal repellent, such as a pepper gel, which does not have the appearance of a typical firearm. The repellent spray dispenser provides a way to easily and simultaneously activate an audible alarm to attract the attention of other people in the area without having to go through multiple mental steps.

These and other aspects, arrangements, features, and/or technical effects will become apparent upon detailed inspection of the figures and the following description.

DETAILED DESCRIPTION OF THE INVENTION

Figure 1:
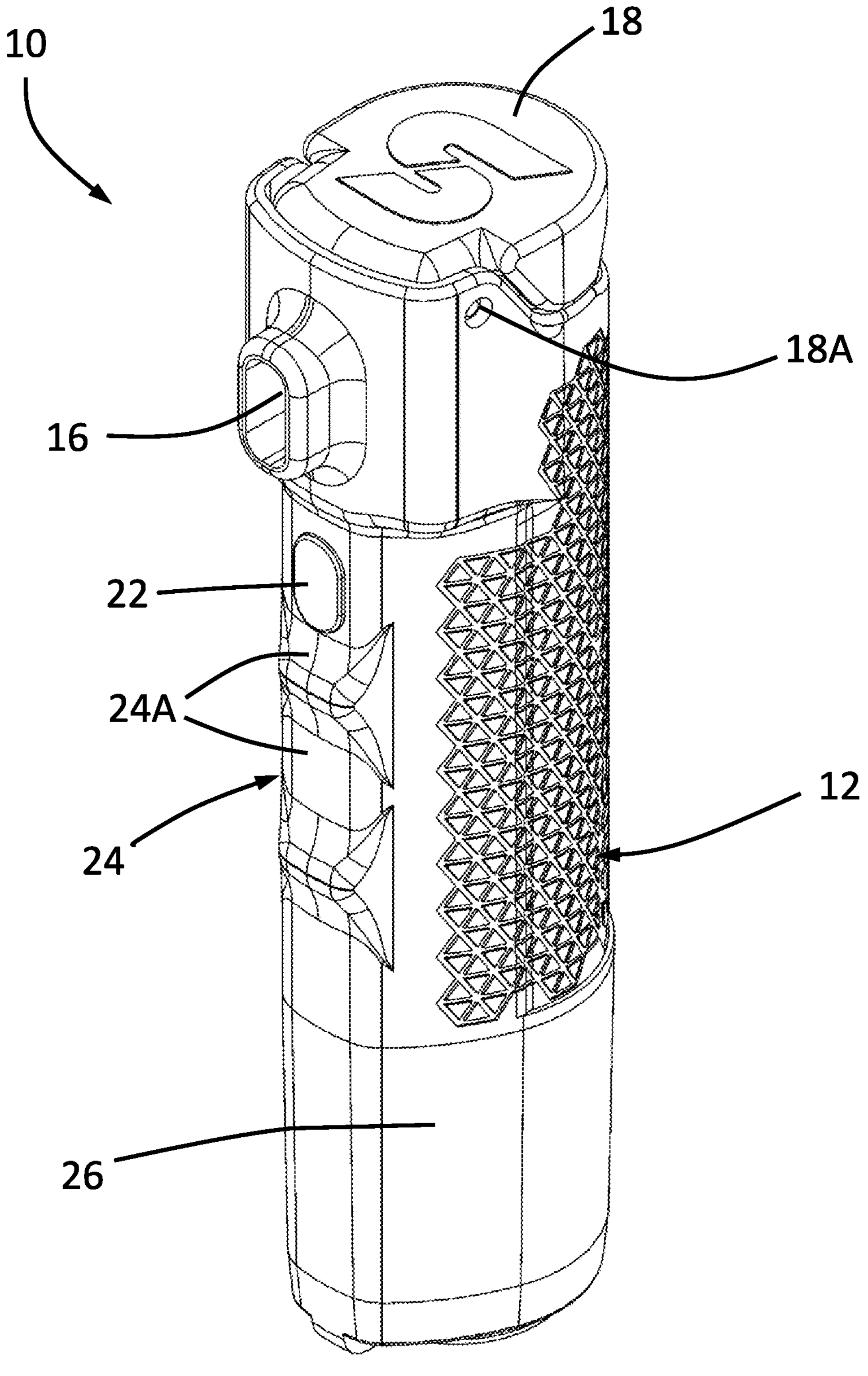
FIG. 1 is a perspective view of a repellent spray dispenser according to a nonlimiting embodiment of the invention.
Figure 2:
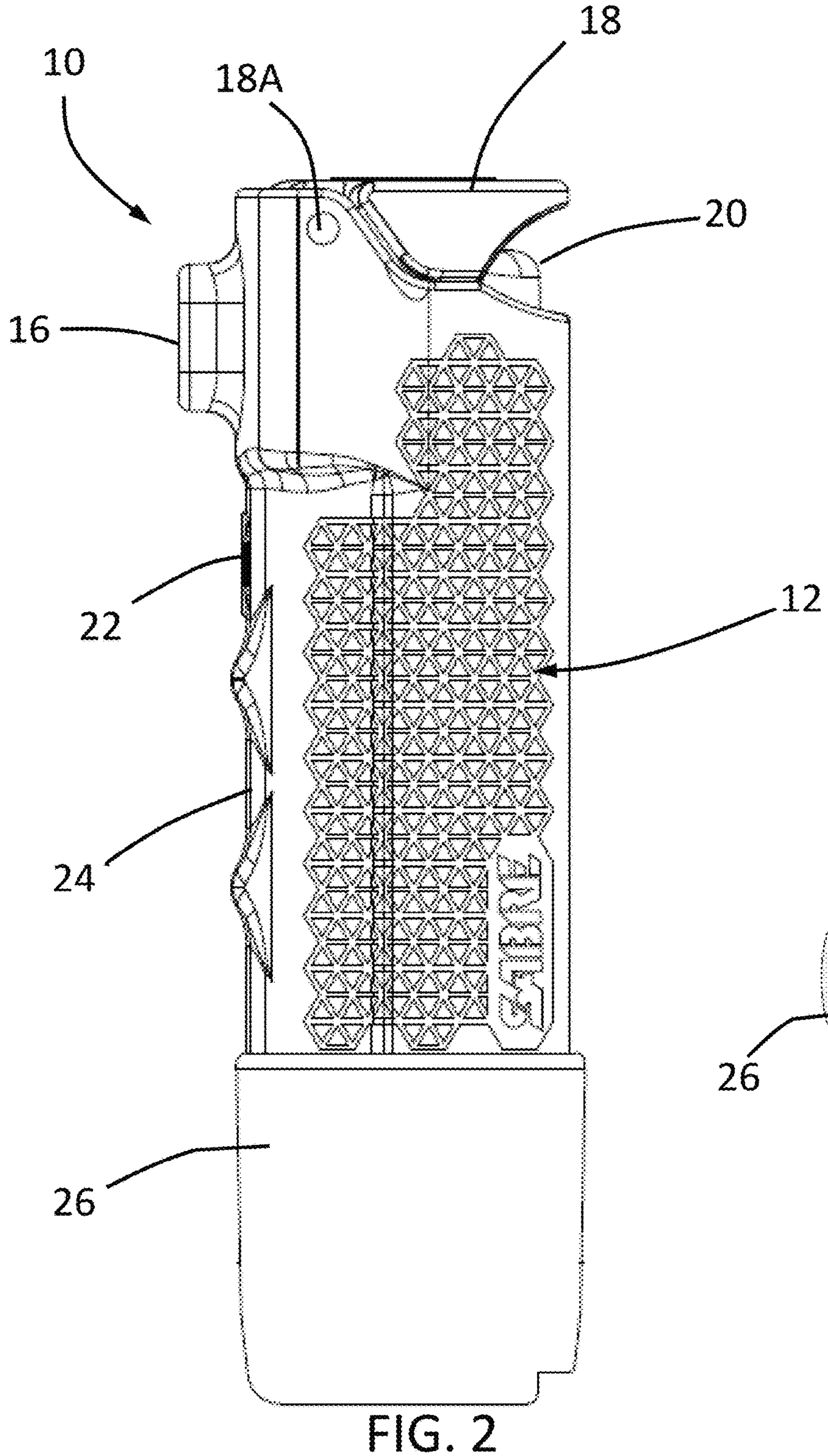
FIG. 2 is a side view of the repellent spray dispenser of FIG. 1.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of the embodiment(s) depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

To facilitate the description provided below of the embodiment(s) represented in the drawings, relative terms, including but not limited to, “proximal,” “distal,” “anterior,” “posterior,” “vertical,” “horizontal,” “lateral,” “front,” “rear,” “side,” “forward,” “rearward,” “top,” “bottom,” “upper,” “lower,” “above,” “below,” “right,” “left,” etc., may be used in reference to the orientation of the repellent spray dispenser during its use and/or as represented in the drawings. All such relative terms are useful to describe the illustrated embodiment(s) but should not be otherwise interpreted as limiting the scope of the invention.

Turning now to the nonlimiting embodiments represented in the drawings, FIG. 1 depicts a repellent spray dispenser 10. The dispenser 10 is a personal safety device that can discharge a stream of a non-lethal repellent, such as a pepper gel or other fluid, semi-fluid, or flowable solid repellent, to deter an attacker or would be attacker. The dispenser 10 includes a case 12 having an outer shell that receives and holds therein a canister 14 (FIG. 4) or similar replaceable container within an interior compartment defined within the case 12. The canister 14 can be a commercially available product or designed specifically for use with the dispenser 10. The dispenser 10 is further represented in FIG. 1 as having an exit orifice 16 configured so that a stream of the repellent propelled from the canister 14 exits the case 12 through the exit orifice 16. A safety cover 18 is disposed at an upper end of the case 12 to prevent or at least reduce the risk of unintentional actuation of a first actuating member 20

(FIG. 4) disposed between the safety cover 18 and the canister 14. For this purpose, the safety cover 18 preferably to at least partially covers and may optionally enclose and conceal the first actuating member 20. The cover 18 is pivotably coupled to the case 12 at a hinge 18A to enable access to the first actuation member 20 from the upper end of the case 12. In the embodiment represented in FIG. 4, the first actuating member 20 is configured to be actuated in a downward direction (indicated by arrow 34) toward a lower end of the case 12 to engage and translate a valve stem 50 in an axial direction thereof, thereby causing the canister 14 to release a stream of the repellent through the exit orifice 16 of the case 12. The valve stem 50 is a component of a valve assembly not shown in the drawings but can be of a known or subsequently developed type of valve assembly capable of releasing the contents of a container under pressure and therefore will not be described in any detail here.

A second actuating member 22 is disposed on a front side of the case 12 in proximate to the exit orifice 16, in the embodiment shown, immediately below the orifice 16. The second actuating member 22 is represented as disposed within one of several recesses 24A of a grip 24 formed on the front side of the case 12. The grip 24 is sized and configured to comfortably accommodate fingers of a user's hand when the case 12 is grasped by the hand, and the recesses 24A are sized and configured to individually accommodate a finger of the user's hand. The case 12 is generally sized to sit comfortably accommodate the user's hand for ease of use and operating the first and second actuating members 20 and 22 independent of each other.

Figure 3:
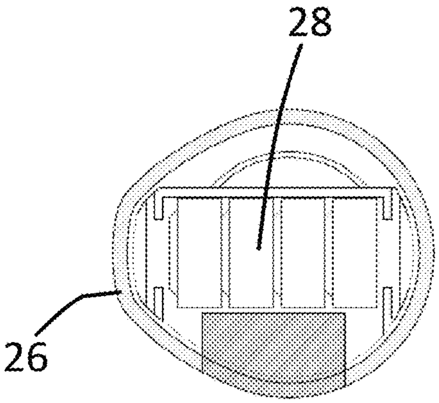
FIG. 3 is a bottom view of the repellent spray dispenser of FIG. 1 and illustrates a cross-section of a battery compartment within the dispenser.
Figure 4:
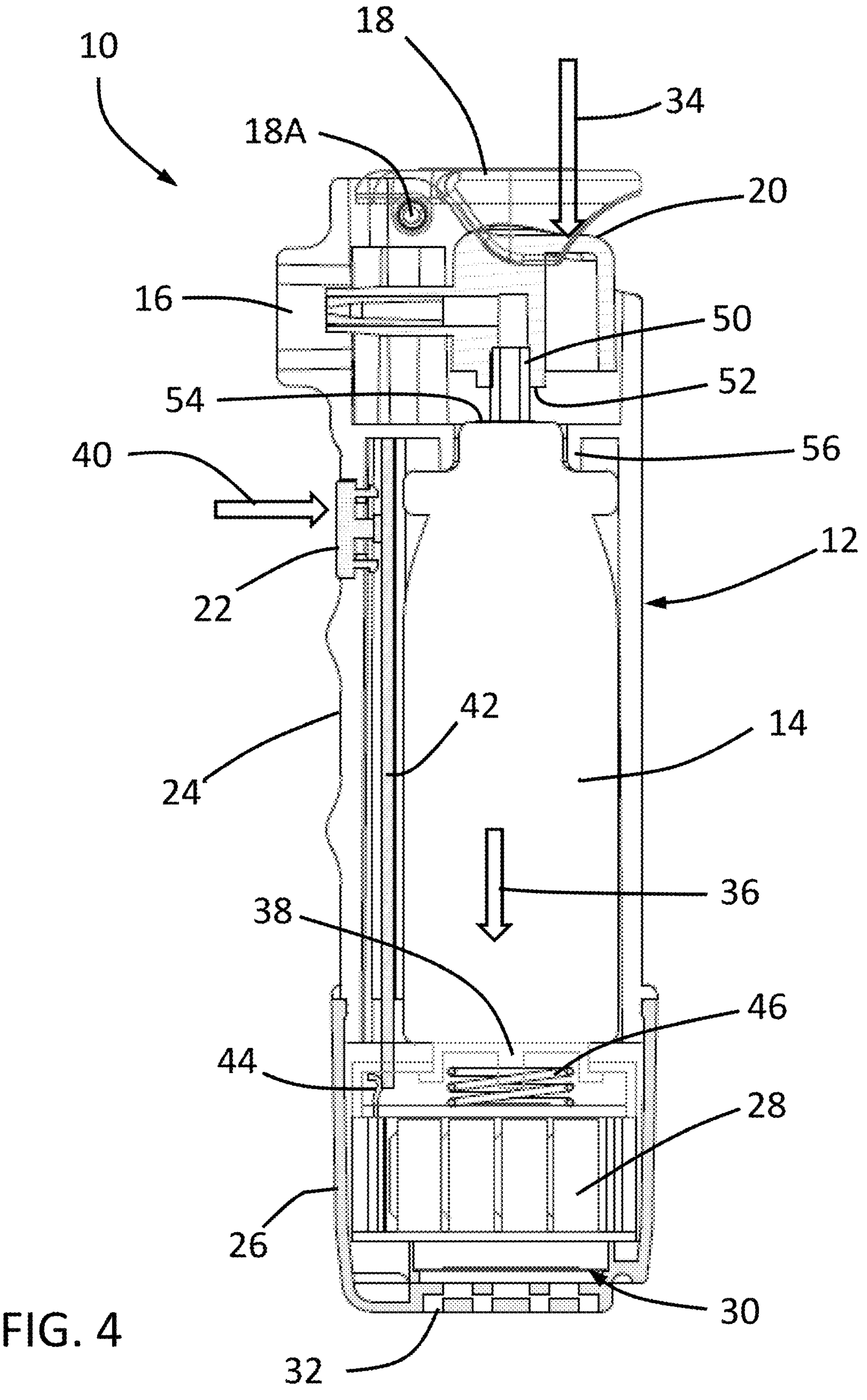
FIG. 4 is a cross-sectional side view of the repellent spray dispenser of FIG. 1.

A battery housing 26 is defined or otherwise disposed at a lower end of the case 12 and, as represented in FIGS. 3 and 4, houses a battery 28 as well as a means 30 for generating an audible alarm. Essentially any generating means 30 of types known or developed in the future may be utilized by the dispenser 10 as long as it can be accommodated within the case 12 and serve to alert individuals in the vicinity of the user, and therefore the dispenser 10 is not limited to any particular means capable of generating an audible alarm. As represented in FIG. 4, an audible alarm generated with the generating means 30 is emitted through a pattern of openings 32 disposed at the lower end of the battery housing 26.

As represented in FIG. 4, a spring 46 biases the canister 14 upward against a fixed rim 56 of the case 12. The canister 14 is thus held by the spring 46 in an upper (unactuated) position but is capable of being translated in a downward direction (indicated by arrow 36) to a lower (actuated) position, closing a switch 38 that delivers power from the battery 28 to the generating means 30. As such, an audible alarm can be generated by the generating means 30 simultaneously with the stream of the repellent propelled through the exit orifice 16 of the case 12. In the nonlimiting embodiment shown, translation of the canister 14 is the result of a shoulder 52 of the first actuating member 20 engaging a rim 54 of the canister 14 surrounding the stem 50. As also evident from FIG. 4, actuation of the first actuating member 20 first causes the stem 50 to translate and release the repellent, and further actuation of the first actuating member 20 causes the shoulder 52 of the first actuating member 20 to engage the rim 54 of the canister 14 and generate an audible alarm with the generating means 30, i.e., the release of the repellent and the generation of the audible alarm occur in a sequence corresponding to an incremental increase in the distance that the first actuating member 20 is translated (actuated). It is also within the scope of the invention that actuation of the first actuating member 20 does not cause sequential release of the repellent and generation of the audible alarm, but instead the release of the repellent and the generation of the audible alarm occur simultaneously as a result of the same translation of the first actuating member 20.

FIG. 4 also represents that actuating the second actuating member 22 in a lateral direction (indicated by arrow 40) of the case 12 serves to translate an arm 42 toward the canister 14, closing a second switch 42 that delivers power from the battery 28 to the generating means 30 to cause an audible alarm to be generated by the generating means 30 independently of and preferably without causing a stream of the repellent to be propelled from the canister 14 and through the exit orifice 16 of the case 12.

In view of the above, a nonlimiting method of using the repellent spray dispenser 10 can entail operating the first actuating member 20 to cause an audible alarm to be generated simultaneously with a stream of repellent propelled through the exit orifice 16 of the case 12, or operating the second actuating member 22 to cause an audible alarm to be generated without causing a stream of repellent to be propelled through the exit orifice 16. If the former step is taken, the method preferably also entails aiming the exit orifice 16 at the attacker. As depicted in FIG. 4, upon releasing the first actuating member 20, the spring 46 causes the canister 14 to translate upward, returning the first actuating member 20 to its original (unactuated) position. Similarly, upon releasing the second actuating member 22, the resiliency of the arm 42 causes the second actuating member 22 to return to its original (unactuated) position. Alternatively, the second actuating member 22 may be returned to its unactuated position by a spring or any other suitable means.

As described above, the dispenser 10 can be appreciated as incorporating a flip-top safety cover 18 and a dual-function alarm capability, namely, sounding only an alarm when only the second actuating member 22 is engaged, and sounding an alarm simultaneously with dispensing a repellent when the first actuating member 20 is engaged. The case 12 can be sized to contain canisters 14 of various sizes, as a nonlimiting example, a 14 g (0.5 ounce) canister commonly available for pepper sprays. Such canisters commonly are capable of propelling a repellent a distance of about twelve feet (about four meters) or more. The generating means 30 is preferably, though not necessarily, capable of generating an audible alarm at a sound level of at least 130 dB over a range of at least 1200 feet (about 400 meters), so as to be capable of alerting individuals in the vicinity of the user. The battery 28 may be an LR44 or similar-sized battery, depending on power requirements and spatial considerations. The battery 28 is preferable capable of having an operating duration of at least twenty continuous minutes.

As previously noted above, though the foregoing detailed description describes certain aspects of one or more particular embodiments of the invention, alternatives could be adopted by one skilled in the art. For example, the repellent spray dispenser 10 and its components could differ in appearance and construction from the embodiment described herein and shown in the drawings, functions of certain components of the dispenser 10 could be performed by components of different construction but capable of a similar (though not necessarily equivalent) function, and various materials could be used in the fabrication of the dispenser 10 and/or its components. As such, and again as was previously noted, it should be understood that the invention is not necessarily limited to any particular embodiment described herein or illustrated in the drawings.

The invention claimed is:

1. A repellent spray dispenser comprising:

a case configured to enclose a canister containing a repellent;

an exit orifice configured so that a stream of the repellent propelled from the canister exits the case through the exit orifice;

means for generating an audible alarm;

a first actuating member operable to cause the audible alarm to be generated simultaneously with the stream of the repellent being propelled through the exit orifice of the case; and a second actuating member operable to cause the audible alarm to be generated without causing the stream of the repellent to be propelled through the exit orifice of the case.

2. The repellent spray dispenser of claim 1, wherein the first actuating member is disposed at an upper end of the case.

3. The repellent spray dispenser of claim 2, wherein the first actuating member is operable to translate in a downward direction toward a lower end of the case, and operable to translate a canister disposed in the case to translate downward within the case.

4. The repellent spray dispenser of claim 3, wherein the translation of the canister within the case closes a first electrical switch that causes the audible alarm to be generated.

5. The repellent spray dispenser of claim 4, wherein the first actuating member is operable so that actuation of the first actuating member first causes the stream of the repellent to be propelled through the exit orifice of the case, and further actuation of the first actuating member causes the first actuating member to engage and translate the canister to generate the audible alarm with the generating means.

6. The repellent spray dispenser of claim 1, wherein the second actuating member is disposed at a front side of the case adjacent the exit orifice.

7. The repellent spray dispenser of claim 6, wherein the second actuating member is disposed below the exit orifice.

8. The repellent spray dispenser of claim 1, wherein the second actuating member is operable to translate in a lateral direction and close an electrical switch that causes the audible alarm to be generated.

9. A method of using the repellent spray dispenser of claim 1, the method comprising aiming the exit orifice at an attacker, and selectively:

operating the first actuating member to cause the audible alarm to be generated simultaneously with the stream of the repellent being propelled through the exit orifice of the case; and operating the second actuating member to cause the audible alarm to be generated without causing the stream of the repellent to be propelled through the exit orifice of the case.

10. The method of claim 9, wherein operating the first actuating member comprises actuating the first actuating member to cause the stream of the repellent to be propelled through the exit orifice of the case, and further actuating the first actuating member to cause the first actuating member to engage and translate the canister to generate the audible alarm with the generating means.

* * * * *